United States Patent
Frey et al.

(10) Patent No.: US 12,437,782 B2
(45) Date of Patent: Oct. 7, 2025

(54) AUTOMATIC NON-LINEAR EDITING STYLE TRANSFER

(71) Applicant: Google LLC, Mountain View, CA (US)

(72) Inventors: Nathan Frey, Venice, CA (US); Weilong Yang, Fremont, CA (US)

(73) Assignee: GOOGLE LLC, Mountain View, CA (US)

( * ) Notice: Subject to any disclaimer, the term of this patent is extended or adjusted under 35 U.S.C. 154(b) by 10 days.

(21) Appl. No.: 18/251,838

(22) PCT Filed: Nov. 13, 2020

(86) PCT No.: PCT/US2020/060347
§ 371 (c)(1),
(2) Date: May 4, 2023

(87) PCT Pub. No.: WO2022/103397
PCT Pub. Date: May 19, 2022

(65) Prior Publication Data
US 2023/0419997 A1    Dec. 28, 2023

(51) Int. Cl.
*G11B 27/031* (2006.01)
*G11B 27/19* (2006.01)

(52) U.S. Cl.
CPC ............ *G11B 27/031* (2013.01); *G11B 27/19* (2013.01)

(58) Field of Classification Search
CPC ....... G11B 27/031; G11B 27/19; G11B 27/28; G11B 27/00; G11B 27/02; G11B 27/022; G06V 20/49; H04N 21/47205

(Continued)

(56) References Cited

U.S. PATENT DOCUMENTS 9,002,175 B1    4/2015   Raj
2006/0251383 A1   11/2006   Vronay et al.
(Continued)

FOREIGN PATENT DOCUMENTS

GB      2387710      5/2002

OTHER PUBLICATIONS

Huang et al., "Shot Change Detection via Local Keypoint Matching", IEEE Transactions on Multimedia, vol. 10, No. 6, Oct. 1, 2008, pp. 1097-1108, XP011236990.

(Continued)

*Primary Examiner* — Thai Q Tran
*Assistant Examiner* — Nienru Yang
(74) *Attorney, Agent, or Firm* — DORITY & MANNING P.A.

(57) ABSTRACT

The present disclosure provides systems, methods, and computer program products for performing automated non-linear editing style transfer. A computer-implemented method may include determining one or more shot boundaries in a video, analyzing identified content in each of one or more shots in the video based on performing object detection, determining an editing style for each of the one or more shots in the video based at least in part on measuring motion across frames within the respective shots, determining a content segment to adjust from a set of target content based on analyzing the set of target content in view of the identified content and the determined editing style of a shot from the video, and automatically adjusting the content segment from the set of target content based at least in part on modifying the content segment with the determined editing style of the shot from the video.

20 Claims, 8 Drawing Sheets

(58) Field of Classification Search
USPC .......................................................... 386/278
See application file for complete search history.

(56) References Cited

U.S. PATENT DOCUMENTS

| | | | |
|---|---|---|---|
| 2014/0026054 A1* | 1/2014 | Rav-Acha | G11B 27/031 |
| | | | 715/723 |
| 2015/0194185 A1* | 7/2015 | Eronen | H04N 21/2665 |
| | | | 386/279 |
| 2018/0204597 A1* | 7/2018 | Rav-Acha | H04N 21/23439 |
| 2018/0255290 A1* | 9/2018 | Holzer | H04N 13/275 |
| 2019/0311747 A1 | 10/2019 | Boonmee et al. | |
| 2020/0012864 A1* | 1/2020 | Hwangbo | G06V 10/764 |

OTHER PUBLICATIONS

International Search Report for Application No. PCT/US2020/060347, mailed on Jul. 5, 2021, 2 pages.
Machine Translated Chinese Search Report Corresponding to Application No. 202080102660.4 on Jun. 12, 2024.
International Preliminary Report on Patentability for Application No. PCT/US2020/060347, mailed May 25, 2023, 11 pages.
Joshi et al., "Interactively Stylizing Camera Motion", Proceedings of the SIGCHI Conference on Human Factors in Computing Systems, CHI, 2014, Toronto, ON, Canada, 4 pages.

* cited by examiner

AUTOMATIC NON-LINEAR EDITING STYLE TRANSFER

PRIORITY CLAIM

This application is based upon and claims the right of priority under 35 U.S.C. § 371 to International Application No. PCT/US2020/060347 filed on Nov. 13, 2020, which is incorporated by reference herein.

FIELD

The present disclosure generally relates to computer vision and the automated processing of visual content. More particularly, the present disclosure relates to systems, methods, and computer program products to perform automatic non-linear editing style transfer.

BACKGROUND

Advances in computer vision and machine learning have improved the detection and classification of objects within visual content. For example, many such improvements have been directed to perception applications in the areas of self-driving vehicles, robotics, and security. However, such applications generally have focused on people and other objects in scenes without particular consideration of how cameras depict various scenes.

Many websites, including content sharing and social networking sites, allow users to store and share images and video content with other users. In addition, smartphones with one or more high-quality digital cameras, abundant storage space, and mobile broadband have made it very easy for users to capture and distribute visual content from anywhere. However, while the amount of newly generated visual content continues to increase over time, most users do not have professional editing skills, access to post-production editing software, or the time to perform intricate editing across vast amounts of raw visual content.

SUMMARY

Aspects and advantages of embodiments of the present disclosure will be set forth in part in the following description, or can be learned from the description, or can be learned through practice of the embodiments.

One example aspect of the present disclosure is directed to a system for performing automatic non-linear style transfer from source content to target content, for example, by determining one or more shot boundaries in a video based on analyzing the video, analyzing identified content in each of one or more shots in the video based on performing object detection on the respective shots, determining an editing style for each of the one or more shots in the video based at least in part on measuring motion across frames within the respective shots, determining a content segment to adjust from a set of target content based on analyzing the set of target content in view of the identified content and the determined editing style of a shot from the video, and automatically adjusting the content segment from the set of target content based at least in part on modifying the content segment with the determined editing style of the shot from the video.

Other aspects of the present disclosure are directed to various apparatuses, non-transitory computer-readable media, computer-implemented methods, user interfaces, and electronic devices. These and other features, aspects, and advantages of various embodiments of the present disclosure will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Overview

Figure 1:
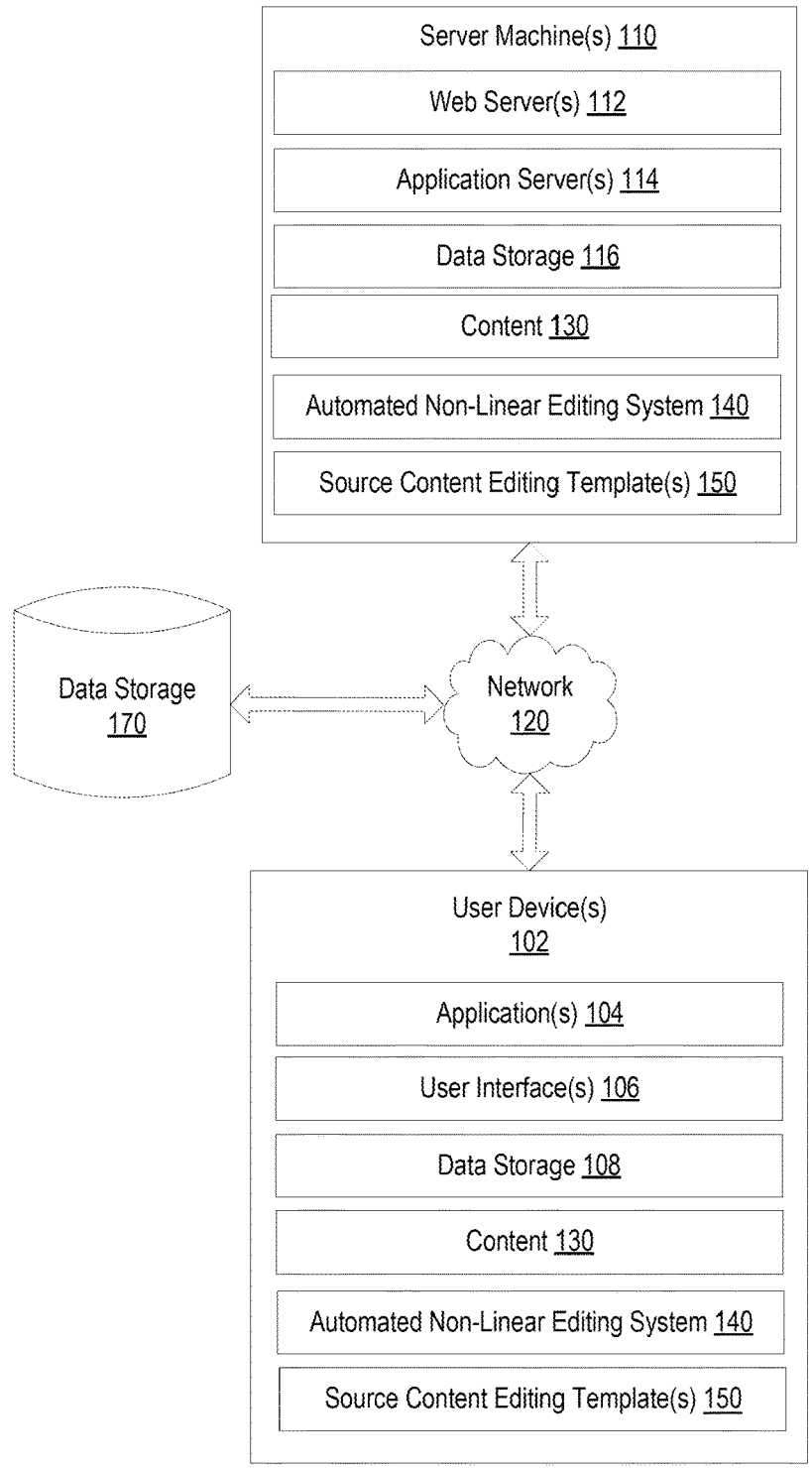
FIG. 1 depicts a block diagram of an example system for performing automated non-linear editing style transfer according to example embodiments of the present disclosure.

Generally, the present disclosure is directed to improving various forms of content including, but not limited to, visual content such as image and video content using automated non-linear editing style transfer. Examples described in the present disclosure enable the automated detection and measurement of editing style in one or more pieces of content, for example, whether provided as part of original content or later introduced using post-production software. In addition, the present disclosure also enables the automated transfer of editing style from source content to other sets and pieces of target content. Further, examples of the present disclosure provide improvements in the automated processing and manipulation of visual content as compared to existing approaches.

The editing style used to capture and present visual content is important to convey an emotion, mood, message, and/or other aspects of the storytelling process. For example, editing attributes generally are considered the building blocks of an editing style. Example editing attributes may include framing, camera motion, focus, transitions, playback speed, audio, volume, color, lighting, etc. When combined together, such editing attributes can leave a significant stylistic impression on an audience.

While raw footage itself may capture an event and tell a story to deliver a message, such content may be altered or enhanced using non-linear editing. Non-linear editing generally refers to a form of post-production editing for audio, video, and/or image content where the original content is preserved, and an edit decision list is compiled to keep track of the edits. Edited content then may be reconstructed from the original content and the edits from an associated edit decision list. Traditional non-linear editing is a manual, time-consuming process that requires certain editing skills and access to specialized editing software. As a result, non-linear editing usually is not performed on user-generated content because of the associated complexity and expense. As such, most user-generated content remains unedited when such content otherwise could be enhanced and improved.

The present disclosure provides examples of performing automated detection, measurement, and transfer of editing style from a piece of source content to a set of one or more pieces of target content as an alternative to conventional approaches. In examples of the present disclosure, a computer system performs automatic, non-linear editing style transfer from source video content to a set of target content by determining one or more shot boundaries in a video based on analyzing the video, analyzing identified content in each of one or more shots in the video based on performing object detection on the respective shots, determining an editing style for each of the one or more shots in the video based at least in part on measuring motion across frames within the respective shots, determining a content segment to adjust from a set of target content based on analyzing the set of target content in view of the identified content and the determined editing style of a shot from the video, and automatically adjusting the content segment from the set of target content based at least in part on modifying the content segment with the determined editing style of the shot from the video.

The systems, methods, and computer program products described herein provide a number of technical effects and benefits. As one example, the embodiments described in the present disclosure perform automated analysis of source content and target content to automatically transfer editing style from the source content to target content more efficiently and with fewer computing resources (e.g., less processing power, less memory usage, less power consumption, etc.), as compared to, for example, conventional and manual post-production editing.

With reference now to the figures, example embodiments of the present disclosure will be discussed in further detail.

Example System for Performing Automatic Non-Linear Style Transfer

FIG. 1 depicts a block diagram of a system 100 for performing automated non-linear editing style transfer according to example embodiments of the present disclosure.

System 100 includes one or more user device(s) 102, one or more server machine(s) 110, and data storage 170 communicatively coupled over a network 120.

Network 120 may be a public network (e.g., the internet), a private network (e.g., local area network (LAN) or wide area network (WAN)), or any combination thereof. In an example, network 120 may include the internet, one or more intranets, wired networks, wireless networks, and/or other appropriate types of communication networks. Network 120 also may comprise a wireless telecommunications network (e.g., cellular network) adapted to communicate with other communication networks, such as the internet. In addition, network 120 may include one or more short-range wireless networks.

User device(s) 102 generally may be a personal computer (PC), laptop, mobile phone, tablet computer, server computer, wearable computing device, or any other type of computing device (i.e., a client machine). User device(s) 102 may run an operating system (OS) that manages hardware and software of a respective device. A browser application (not shown) may run on user device(s) 102. The browser application may be a web browser that can access content and services provided by server machine(s) 110, or a combination of server machine(s) 110. Other types of computer programs and scripts also may run on user device(s) 102.

User device(s) 102 include one or more application(s) 104, user interface(s) 106, and data storage 108. User device(s) 102 generally may execute or run one or more application(s) 104 or client versions of application(s) 104 that interoperate with one or more of server machine(s) 110. For example, application(s) 104 may include or provide access to one or more automated non-linear editing system(s) 140 and services.

Application(s) 104 each generally may provide user interface(s) 106 that allow a user to submit user input and to receive various text, graphics, and audio output in association with a respective application(s) 104 running on user device(s) 102. For example, a user generally may provide user input to application(s) 104 via user input components of a respective user device 102, such as a touch-sensitive component (e.g., a touch-sensitive display screen or a touch pad) that is sensitive to the touch of a user input object (e.g., a finger or a stylus), a virtual keyboard, a traditional keyboard, a mouse, a microphone, a traditional keyboard, or by other means in which a user can provide input to application(s) 104 via a device. A user also may receive output from an application 104 via one or more user interface(s) 106 provided via a display, user device(s) 102, computing system, or any other type of device.

Application(s) 104 may include, for example, social networking, photo sharing, video sharing, storage service, and/or any other type(s) of "apps" that run on user device(s) 102. Further, such application(s) 104 may have corresponding web sites, services, and/or APIs that may be used in association with or separate and apart from application(s) 104. Data storage 108 generally may include any removable or non-removable storage device(s) associated with user device(s) 102, which generally also may have access to other various storage (e.g., data storage 116, data storage 170) via network 120.

Server machine(s) 110 each may include one or more web server(s) 112 and/or one or more application server(s) 114. Web server(s) 112 may provide text, audio, image, video, or any other content from server machine(s) 110 or other sources (e.g., data storage 116, 170) and user device(s) 102. Web server(s) 112 also may provide web-based application services, business logic, and interfaces to server machine(s) 110 and user devices. Web server(s) 112 also may send and receive text, audio, video, and image content to and from user device(s) 102, which may be stored or provided by, for example, data storage 108, 116, 170 for preservation, sharing, and/or publication of content 130.

In an example, one or more web server(s) 112 are coupled to one or more application server(s) 114 that provide application services, data, business logic, and/or APIs to server machine(s) 110 and user device(s) 102. In some examples, application server(s) 114 provide one or more such services independently, without use of web server(s) 112. In an example, web server(s) 112 may provide server machine(s) 110 and user device(s) 102 with access to one or more application server(s) 114 services associated with an automated non-linear editing system (e.g., automated non-linear editing system 140). Such functionality also may be provided as part of one or more different web applications, standalone applications, systems, plug-ins, web browser extensions, and application programming interfaces (APIs), etc. In some examples, plug-ins and extensions generally may be referred to, individually or collectively, as "add-ons."

Server machine(s) 110 include local data storage 116 and have access to other data storage 170 to store and access various forms of content 130. In an example, server machine(s) 110 may provide, be associated with, or be used in conjunction with one or more cloud or web-based services and applications, such as a social networking site, a cloud storage provider, a content sharing site, an image sharing site, a video sharing site, and/or any other site, service, or application that stores, processes, and displays user-generated and/or other types of content 130. In various examples, such sites, services, and/or applications may be accessed by users via one or more application(s) 104 running on respective user device(s) 102.

In an example, user device(s) 102 and server machine(s) 110 may store and access various forms of content 130 (e.g., source content, target content) from data storage (e.g., data storage 108, 116, 170). In an example, content generally may refer to any textual data, audio data, visual data, graphical data, graphics, images, videos, multimedia, and/or any other data used to represent or describe various forms or formats of any type of content of any dimension (e.g., 2D, 3D). In various examples, content 130 may be raw or newly captured, preprocessed or partially edited, professionally edited, curated, and/or user generated.

Data storage 170 generally refers to persistent storage capable of storing various types of content 130, such as text, audio, video, and images. In some examples, data storage 170 may include a network-attached file server or cloud storage, while in other examples data storage 170 may include other forms of persistent storage such as an object-oriented database, a relational database, and so forth. Data storage 170 may include user generated content 130 (e.g., user generated images, videos, etc.) uploaded by user device(s) 102 and/or content 130 provided by one or more other parties. Data may be added to data storage 170, for example, as discrete files (e.g., motion picture experts group (MPEG) files, windows media video (WMV) files, joint photographic experts group (JPEG) files, graphics interchange format (GIF) files, portable network graphics PNG) files, etc.) or as components of a single compressed file (e.g., a zip file).

Content 130 generally may include visual content such as images and videos. Images generally may include any visual or graphical representation such as photographs or screenshots that are captured by a camera, computing device, or other device. Images may include, for example, portrait, square, panoramic, and/or any other types of images.

A video generally refers to a set of sequential image frames representing a scene in notion. For example, a series of sequential images may be captured continuously or later reconstructed to produce the effect of a moving picture, which may include camera motion and/or motion of contents within a scene. Video content may be presented in various formats including, but not limited to, analog, digital, two-dimensional and three-dimensional video. Further, video content nay include movies, video clips, or any set of animated images to be displayed in sequence. Video data may include digital videos having a sequence of static image frames that also may be stored as image data. Thus, each image frame may represent a snapshot of a scene that has been captured according to a time interval.

In various examples, user device(s) 102 and/or server machine(s) 110 run, execute, or otherwise utilize automated non-linear editing system 140 and associated source content editing template(s) 150. For example, user device(s) 102 may include one or more application(s) 104 associated with a service (e.g., automated non-linear editing system 140) provided by one or more server machine(s) 110. For example, various types of computing devices (e.g., smart phones, smart televisions, tablet computers, smart wearable devices, smart home computer systems, etc.) may use specialized apps and/or APIs to access services provided by server machine(s) 110, to issue commands to server machine(s) 110, and/or to receive content from server machine(s) 110 without visiting or using web pages.

In an example, functions performed by one or more of server machine(s) 110 may be performed by one or more other machine(s) and/or user device(s) 102, in whole or in part. Server machine(s) 110 may be accessed as a service provided by systems or devices via appropriate application programming interfaces (APIs) and data feeds, and thus are not limited to use with websites. Further, server machine(s) 110 may be associated with and/or utilize one or more automated non-linear editing system 140 services, for example, independently operated or offered by different providers.

In various examples, automated non-linear editing system 140 analyzes various types of visual content, such as image and video data to detect, measure, and transfer editing style from a set of one or more pieces of source content to another set of one or more pieces of target content. In an example, automated non-linear editing system 140 performs various automated analysis on existing, edited video content to detect and measure editing style present in the video content and automatically applies the editing style to other edited and/or unedited content, such as segments from one or more videos, an image, a sequence of images, and/or a collection of images in target content.

Editing style generally refers to a collection of one or more stylistic attributes associated with content 130, which may include attributes present in original content and/or stylistic attributes applied as part of an editing process. In some examples, content 130 may include one or more editing styles based on one or more combinations of attributes associated with the content and/or specific portions of content such as particular shots in video content. Editing style attributes generally may include, but are not limited to, framing, camera motion, focus, zoom, transition, playback speed, color, lighting, audio, and/or text associated with content 130 or specific portions of content 130.

In various examples, camera framing generally refers to placement and position of subject matter within shots. Focus generally refers to focus of a lens during a shot and may include, for example, deep focus, shallow focus, soft focus, and/or other types of focus. Camera motion types generally may include stationary cameras, pan-tilt-zoom (PTZ) camera motion, and/or six degrees of freedom camera motion. Zoom generally refers to change in focal length of a zoom lens during a shot that allows change from a close-up view to a wide/full/long view, or vice versa, during a shot.

Transition generally refers to the way that two or more shots of visual content are combined or joined together. Example transitions generally include, but are not limited to, dissolving, fades, wipes, and various forms of cuts (e.g., L cuts, jump cuts, cut-in, cut-away, match cuts, etc.).

Color generally refers to color attributes or coloring schemes applied to visual content. For example, visual content can be presented in full color or various types of coloring schemes (vivid, warm, cool, etc.). Such content also may be presented in greyscale, black and white, silvertone, etc. Lighting generally refers to lighting captured and/or applied to visual content. Various lighting aspects of visual content may include, but are not limited to, light fading, light filtering, glare, brightness, contrast, etc.

Playback speed generally refers to playback speed of content, such as visual and/or audible content. Playback speed may be adjusted, for example, from a native, real-time value (e.g., 1×) to faster speeds, (e.g., 1.25×, 1.5×, 2×, etc.) or slower speeds (e.g., 0.75×, 0.5×, etc.). In addition to fixed speeds, speed may be adjusted dynamically in rigid patterns (e.g., speed ramp, piecewise linear transition) or complex patterns where playback speed changes irregularly.

Audio generally refers to audio content, for example, such as background music, sound, or voice over audio that is associated with content 130. For example, audio present within source content may or may not be transferred along with other editing style attributes to target content. Similarly, text such as text overlays may be associated with content 130. Text associated with source content also may or may not be transferred to target content with other editing style attributes. Various other editing style attributes may include, but are not limited to content quality, content sizing, content orientation, resolution, etc.

In various examples, automated non-linear editing system 140 analyzes content 130 to automatically detect and measure various editing style attributes present in or associated with the content. Automated non-linear editing system 140 generally may represent detected and measured editing style attributes using data and metadata. For example, automated non-linear editing system 140 may generate one or more editing styles for a piece of content with each editing style, for example, representing different groupings of editing style attributes. Automated non-linear editing system 140 also may generate a single editing style comprising some or all of the editing style attributes detected and measured in source content. Source content generally refers to content 130 that is used as a model or source of style that is to be transferred to a set of one or more other pieces of content 130, which may be referred to as target content.

In various examples, automated non-linear editing system 140 automatically detects and measures editing style attributes for source content and records the information in a source content editing template(s) 150 that may be used and then reused for automatically transferring editing style from the source content to various collections of target content from any number of users (1, 10, hundreds, thousands, millions, etc.). As such, editing style attributes may be automatically extracted and described as data and metadata that can later be analyzed and used at various times and by various users to transfer editing style from the source content to various types of target content. Source content editing template(s) 150 may include, for example, global editing style attributes consistent within source content and/or may include local editing style attributes associated with particular portions, segments, or periods of time within source content. In some examples, source content editing template(s) 150 may include information about detected shot boundaries in a video, information about one or more of the shots in the video, information about content identified within respective shots of the video, and/or editing style attributes determined at various times across various frames from the shots in the video.

Example Methods Performing Automatic Non-Linear Style Transfer

Figure 2:
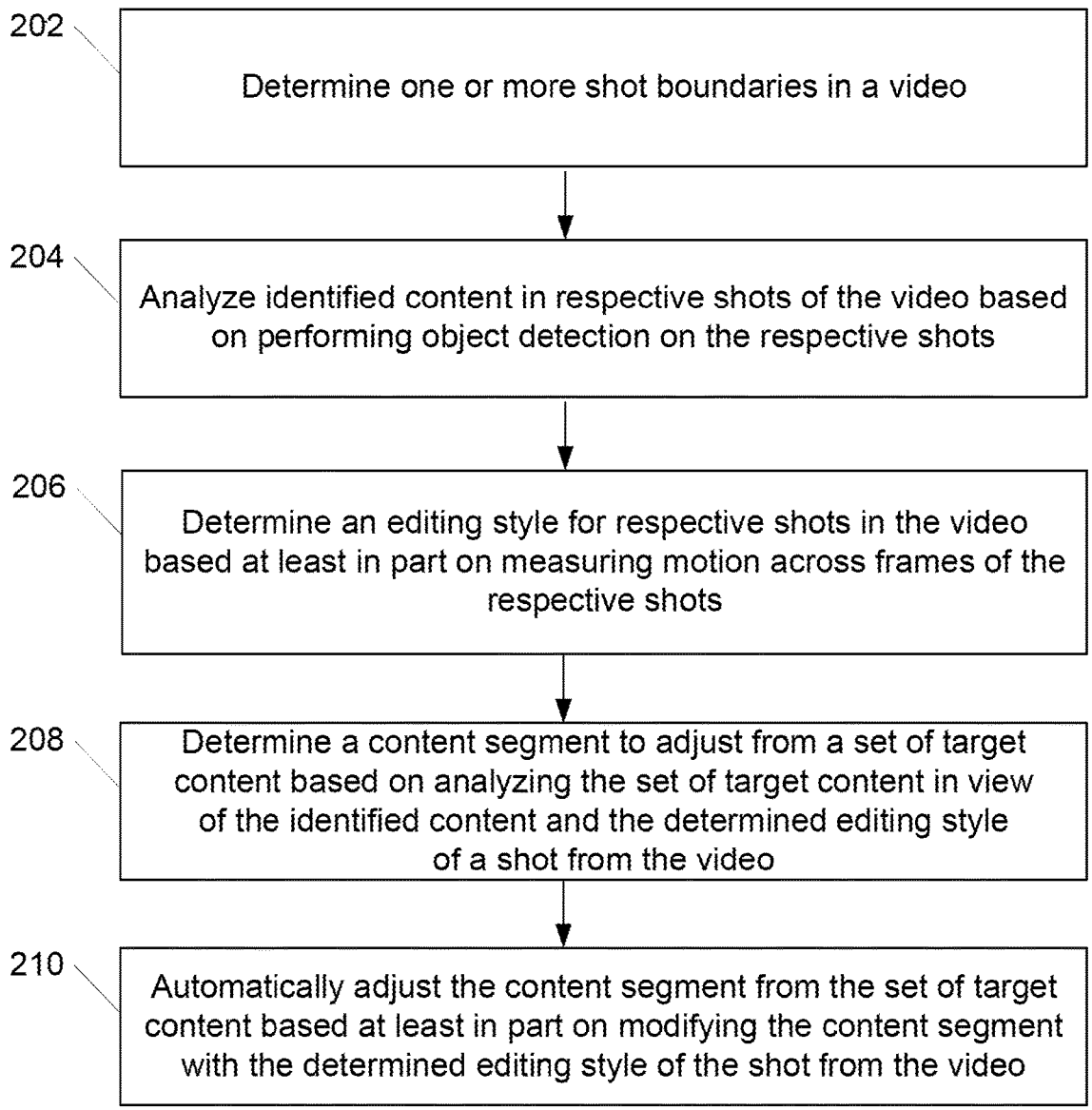
FIG. 2 depicts a flow diagram of an example method for performing automated non-linear editing style transfer according to example embodiments of the present disclosure.

FIG. 2 depicts a flow diagram of an example method for performing automated non-linear editing style transfer according to example embodiments of the present disclosure.

Although FIG. 2 depicts steps performed in a particular order for purposes of illustration and discussion as an example, the methods of the present disclosure are not limited to the particularly illustrated order or arrangement. The various steps of the method 200 can be omitted, rearranged, combined, and/or adapted in various ways without deviating from the scope of the present disclosure.

At 202, a computing system determines one or more shot boundaries in a video. In an example, a computing system receives one or more pieces of source content that are to be used for automated non-linear editing style transfer. For example, a user may provide a set of one or more pieces of original and/or edited content such as images, a burst of photographs, video clips, movie trailers, montages, music videos, highlight reel videos, advertisement videos, or any other type of content. In various examples, the computing system receives a set of one or more pieces of video content as source content to perform automated non-linear editing style transfer onto a set of one or more pieces of target content.

In an example, automated non-linear editing system 140 of the computing system analyzes source video content to detect one or more shot boundaries present in the source video content. For example, the computing system may perform shot boundary detection analysis based on detecting color changes and/or identifying keypoint matches across video frames to identify shot boundaries and associated shots. A shot generally may be referred to as a continuous view or series of frames captured or filmed by a camera without cuts, jumps, or other interruption. In some examples, shots may be grouped together into what may be referred to as groups of shots or scenes that are depicted within video content. In some examples, shots may be constructed or reconstructed from various images that may or may not be associated with video content.

In an example, automated non-linear editing system 140 performs color analysis across frames of video content and signals a shot change based on detecting a significant change in color across video frames. For example, color may be tracked across one or more video frames and an occurrence of a shot change may be signaled when the color of one or more frames differs from color in one or more other comparison frames beyond a threshold. In some examples, automated non-linear editing system 140 computes a color histogram for each of one or more frames, compares the color histogram information with prior frames, and signals a shot change when distribution of frame colors changes at a rate that differs from color representation along a sliding historical window.

In an example, automated non-linear editing system 140 determines shots, shot groupings, scenes, and/or shot boundaries in video content by performing keypoint matching within respective frames and matching the identified keypoint set across frames by using approximate nearest-neighbor search and by applying weak geometric constraints in the form of a fundamental matrix to arrive at a set of spatially consistent keypoint matches. In some examples, shot boundaries may be identified based on detecting a significant change in keypoint matches occurring between frames. For example, a significant change in keypoints across frames beyond a threshold level may be used to signal a shot change.

In some examples, color analysis and keypoint matching may be used together to identify shots, detect shot boundaries, and/or to group shots into scenes. One or more other types of shot boundary and shot identification may be used alone or in combination with color analysis and/or keypoint matching. For example, one or more machine learning models may be used to automatically detect, predict, or confirm transitions between frames in video content.

At 204, the computing system analyzes identified content in respective shots of the video based on performing object detection on the respective shots. In an example, automated non-linear editing system 140 of a computing system analyzes frames of identified shots by performing object detection on frames of respective shots to classify content and focus of the shots. In some examples, automated non-linear editing system 140 runs object detection on one or more frames of a shot to identify a set of one or more objects present in the shot. An identified list of objects then may be analyzed, for example, from largest to smallest. In an example, the union of the box of each object may be computed iteratively until frame coverage exceeds a threshold value (e.g., 50%, 65%, 80%, or any percentage of frame coverage). As such, the list of identified objects may be analyzed up to a point where the analyzed objects cover enough space in a frame allowing classification of shot.

In some examples, automated non-linear editing system 140 identifies, analyzes, and determines characteristics and details about identified faces and human poses as part of object detection, including but not limited to emotions, expressions, and activities. In some examples, automated non-linear editing system 140 may identify, analyze, and determine characteristics and details about one or more objects, such as a food, products, instruments, animals, or other objects present in visual content. In various examples, one or more objects, characteristics, expressions, activities, and/or other aspects of a shot identified via object detection and analysis may be used, for example, at least in part to identify matching target content having similarity, consistency, and/or compatibility with source content.

In an example, automated non-linear editing system 140 performs object detection and analysis on visual source content and then identifies shot focus of the visual source content. In some examples, shots comprising a small number of objects, for example as defined by one or more thresholds, may be classified or labeled as single-focus shots. For example, single-focused shots generally may represent camera attention and/or motion that tends to focus on one or more particular objects in a shot or across shots.

In some examples, shots comprising a medium number of objects, for example as defined by one or more thresholds, may be classified or labeled as medium-focus shots. For example, medium-focus shots generally may include groups of one or more people and/or products or an arrangement of text overlays. As such, medium-focus shots generally may be focused on a number of objects in a shot rather than on particular objects. In some examples, shots may be labeled or classified as having little or no specific object focus. For example, shots of crowds, landscapes, and/or general b-roll footage may not have specific focus on particular objects.

Figure 4:
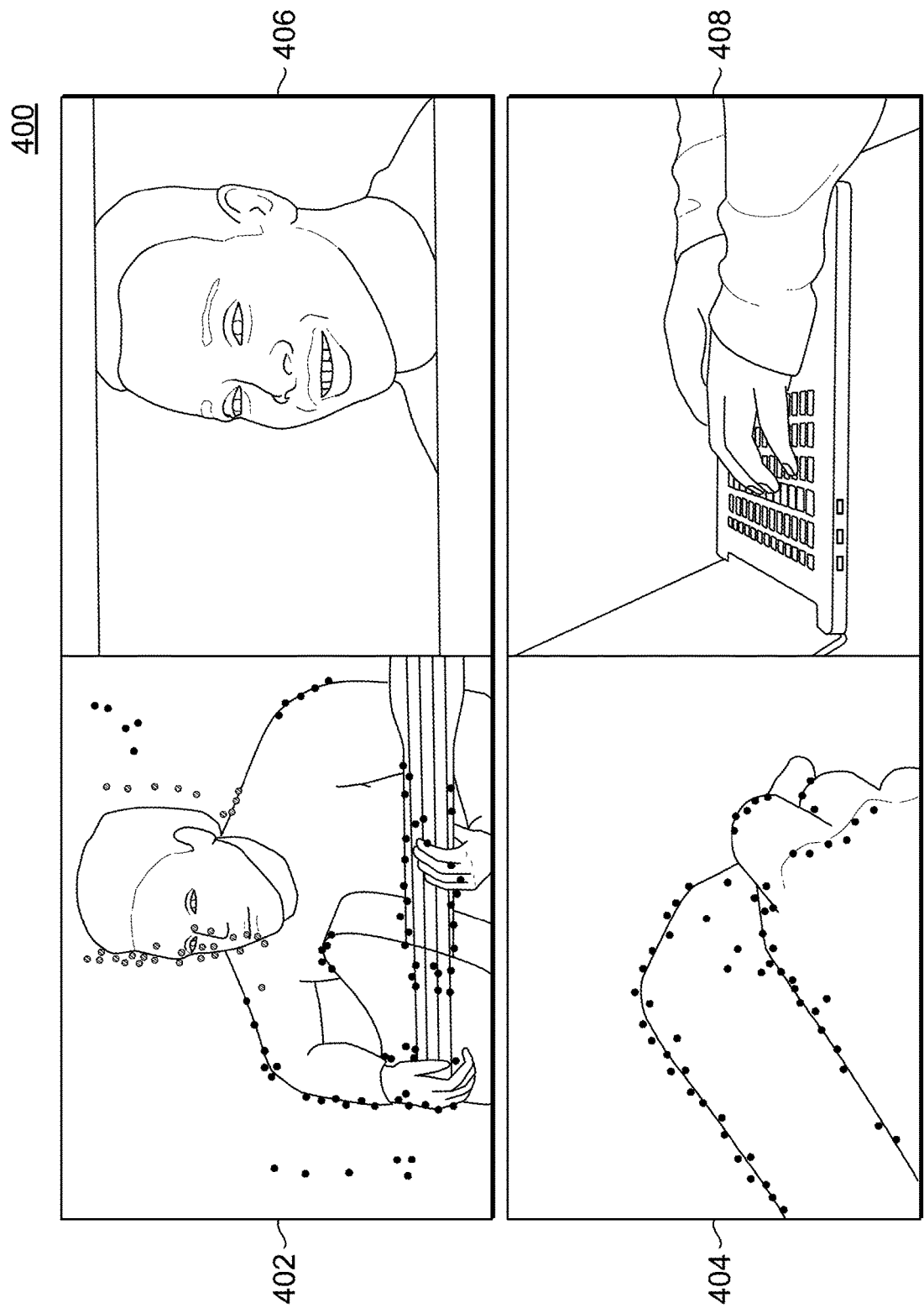
FIG. 4 depicts an illustration of example matching performed between source content and target content according to example embodiments of the present disclosure.

FIG. 4 depicts an illustration 400 showing example matching that may be performed between source content and target content according to example embodiments of the present disclosure. For example, a first example of source content 402 may be processed using object detection and classified as being focused on a single on a small number of objects, including the face of a human. The first example of source content 402 then may be determined to be compatible and matched with a first example of target content 406, for example, also processed using object detection and classified as being focused on a small number of objects including a human face. Similarly, a second example of source content 404 focused on a close-up shot of hands during eating may be determined to be compatible and matched with a second example of target content 408 focused on a close-up shot of hands during typing. In various examples, results of object detection and analysis performed on source and target content may be used as one set of considerations and criteria when matching source content to target content when performing automated non-linear editing style transfer.

At 206, the computing system determines an editing style for respective shots in the video based at least in part on measuring motion across frames of the respective shots. In an example, automated non-linear editing system 140 of a computing system analyzes shots from source visual content to determine one or more editing style attributes of an editing style used in the respective shots. In an example, automated non-linear editing system 140 detects and measures camera motion in a shot or across a group of shots in source visual content. For example, automated non-linear editing system 140 may detect and measure camera motion or how a camera moves across a set of frames in one or more shots.

In an example, camera motion may be represented as a frame-to-frame reprojection of an image as a projective transformation: $H_{ref}$. In various examples, automated non-linear editing system 140 calculates camera motion or movement, for example respectively in each of source content and/or target content, using frame-to-frame keypoint matching and the utilization of a random sample consensus (RANSAC) homography solver or another type of homography solver. In some examples, keypoints are tracked at least on foreground objects, background objects, and human foreground objects. In some examples, keypoints detected on a face or body are rejected using a classifier or other tool to remove foreground motion from a homography estimation. In various examples, camera motion or movement detected across frames may be determined based on measuring the distance between respective keypoints across frames where the current total reprojection is the left-multiplied accumulation of prior projections: $H_{ref}(t)=H_{ref}(t) *H_{ref}(t-1)*H_{ref}(t-2) \ldots *H_{ref}(t^{start})$.

Figure 5:
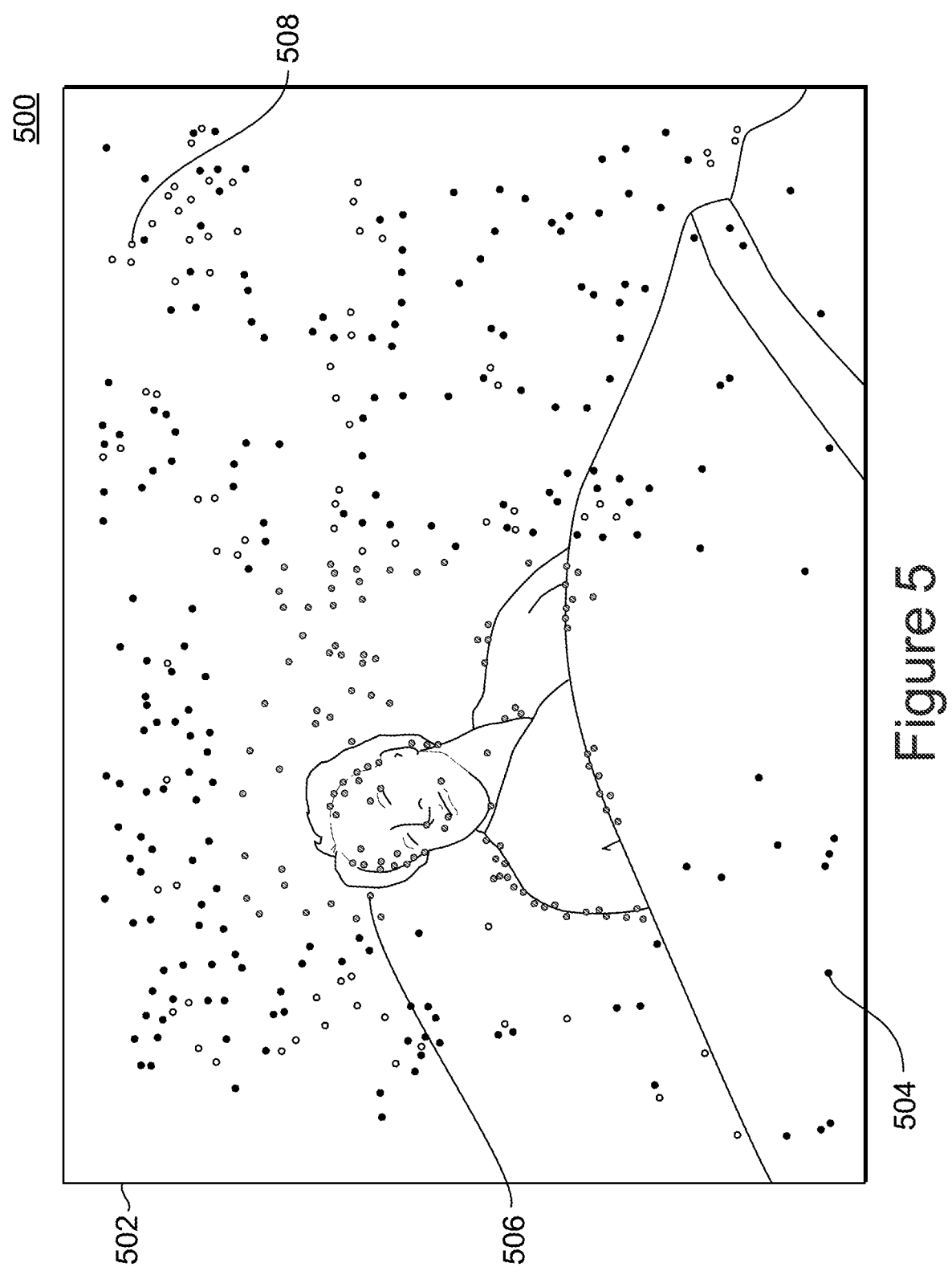
FIG. 5 depicts an illustration of example keypoint tracking for automated non-linear editing style transfer according to example embodiments of the present disclosure.

FIG. 5 depicts an illustration 500 of example keypoint tracking for automated non-linear editing style transfer according to example embodiments of the present disclosure. In an example, keypoints may be tracked in a frame of content, such as a video frame 502. In an example, keypoints 504 generally may be tracked on foreground and/or background objects, human foreground keypoints 506 also may be tracked, and matching keypoints 508 may be identified across frames of video content to detect and measure camera motion. As noted above, in some examples, human foreground keypoints 504 may not be considered when detecting and measuring camera motion.

Figure 6:
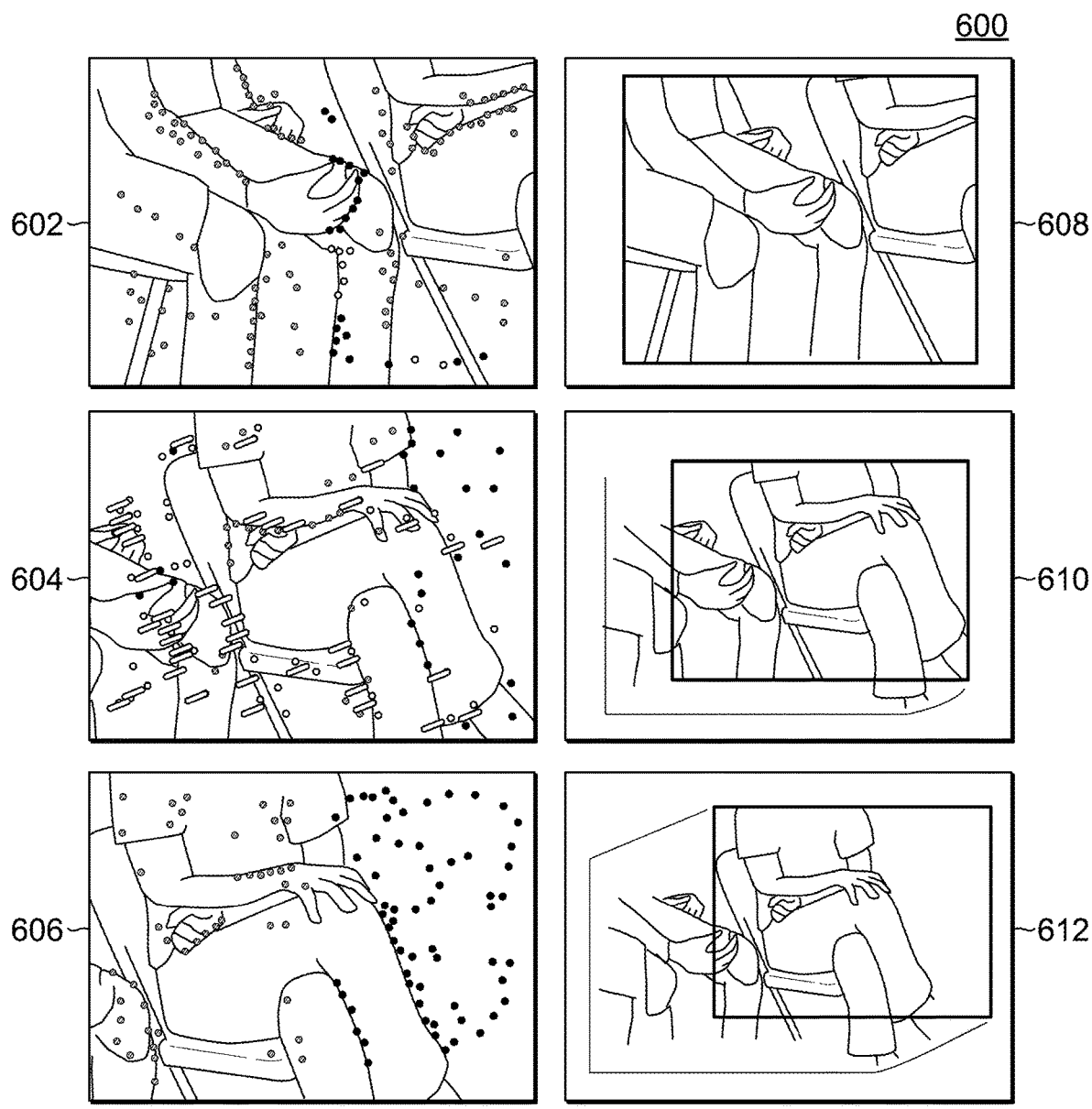
FIG. 6 depicts an illustration of example frame-to-frame keypoint tracking to measure camera motion for automated non-linear editing style transfer according to example embodiments of the present disclosure.

FIG. 6 depicts an illustration 600 of example frame-to-frame keypoint tracking to measure camera motion for automated non-linear editing style transfer according to example embodiments of the present disclosure. Frames 602, 604, and 606 show keypoint tracking across a series of frames where a camera pans across a scene that includes two sitting people. Using frame 602 as a starting position, keypoints in frame 604 stretch to lines showing frame-to-frame keypoint tracking used to form a homography, and frame 606 generally represents where camera movement ends in the example. Frames 608, 610, and 612 represent the actual frames without keypoint tracking where frame 608 corresponds to the starting position at frame 602, frame 610 corresponds to frame 604 showing movement from the starting position, and frame 612 corresponds to frame 606 after completion of the camera movement.

In various examples, such movement measured in source content may be transferred to target content, for example during a user session or as part of a batch processing. In some examples, movement in source content may be measured and stored in one or more source content editing template(s) 150, for example, based on timing, position, and/or identity of associated video frames and using various data describing the movement occurring across frames. As such, source content editing template(s) 150, for example, can be used and reused to perform automated non-linear editing style transfer at different times onto different sets of one or more pieces of target content without repeatedly reanalyzing source content for each request.

In various examples, automated non-linear editing system 140 analyzes content to determine one or more editing style attributes associated with the content. For example, content may be analyzed directly or with the assistance of one or more general or specialized classifiers or models to identify editing style attributes, such as framing, camera motion, focus, zoom, transition, playback speed, color, lighting, audio, and/or text associated with content generally and/or with specific portions of content. Such information may include data and metadata describing editing style attributes and their relation to the content or specific portions of the content (e.g., shots, frames, timing, sequence, etc.), which may be stored as part of source content editing template(s) 150.

At 208, the computing system determines a content segment to adjust from a set of target content based on analyzing the set of target content in view of the identified content and the determined editing style of a shot from the video. In an example, automated non-linear editing system 140 of a computing system receives a set of one or more pieces of target content to match to source content as part of performing automatic non-linear editing style transfer from the source content. (e.g., by transferring style from edited source content footage to target content)

In an example, automated non-linear editing system 140 receives a set of one or more pieces of user-generated content, which may include visual content such as one or more images and or one or more videos provided by a user. In some examples, a user may provide or select source content that automated non-linear editing system 140 analyzes and processes to determine source content editing style that is to be transferred to target content such as one or more pieces of content created by the user. A user also may select or provide a source content editing template(s) 150 comprising a source content editing style to be transferred, for example, target content of the user.

In an example, automated non-linear editing system 140 analyzes each of one or more pieces of content in a set of target content to determine which portions of the target content are compatible with the source content for automated non-linear style transfer. For example, automated non-linear editing system 140 may perform shot boundary detection on target video content to identify shots, perform object detection and analysis on shots and images to identify objects and shot focus, and to identify one or more editing style attributes of the target content.

In an example, automated non-linear editing system 140 compares editing style attributes from each of one or more portions of source content to information determined about each of one or more portions of the target content. For example, automated non-linear editing system 140 may compare one or more of shot length, object content(s), shot focus, and/or one or more editing style attributes of a portion of source content to each of one or more pieces or portions of content within a set of target content. Such comparison may be performed, for example, to match source content and target content for automated non-linear style transfer based on one or more of compatibility to allow style transfer to occur between source content and target content or to match similar objects, scenery, focus and/or other attributes across source content and target content that are generally otherwise unrelated. In an example, source content and target content may be matched based on objects, mood, focus, movement, scenery, editing style, and other considerations to allow the editing style of the source content to be applied to the target content while preserving the expression and meaning delivered in the source content when applied to the target content.

In an example, a model may be trained and used to analyze, compare, and match various portions of source content and target content. In some examples, each of one or more portions or segments of source content is compared and scored against one or more portions or segments of target content. For example, shot length may be compared between shots of source content and shots of target content to determine that shot length of the target content is sufficient for performing style transfer to the target content.

In an example, source content is matched to target content based on shot focus where shots classified as single-focused, medium focused, and/or little or no focus are matched in source and target content. In some examples, objects, expression, activity and other content may be weighted more heavily when matching single-focus shots to determine appropriate target footage as compared to matching medium-focused shots, which generally may be weighted based on global behavior of such shots. Landscape footage in source content generally may be identified as compatible and matched with target content also classified as having little or no focus.

In an example, automated non-linear editing system 140 matches one or more portions or segments of source content to different portions or segments in target content. For example, a source content video having eight shots each with similar or different timing may have one or more global and/or shot-specific editing style attributes. Automated non-linear editing system 140 generally may process each of the source video shots to identify compatible target content based on constraints (e.g., shot length, frame size), object identification, shot focus, content similarity, and other aspects to match different segments of the target content (e.g., shots from one or more videos in target content) to corresponding shots of the source content.

At 210, the computing system automatically adjusts the content segment from the target content based at least in part on modifying the content segment with the determined editing style of the shot from the first video. In an example, automated non-linear editing system 140 adjusts a shot of target video content that has been matched to a shot of source video content by transferring one or more editing style attributes extracted from the shot of source video content to the matched shot of target video content. In various examples, each of one or more segments of target content (e.g., shots, images, etc.) are matched to source content (e.g., shots, images, etc.). Editing style attributes of segments source content then are automatically transferred to corresponding segments of matching target content, for example, to generate and present target content having the editing style attributes of the source content.

In an example, a set of one or more segments of source content have been matched to respective corresponding segments of target content. Editing style attributes detected in one or more of the segments of source content then are transferred to the respective corresponding segments of target content. Such editing style attributes may include, but are not limited to, one or more of information about framing, camera motion, focus, zoom, transition, playback speed, color, lighting, audio, or text. Further, such editing style attributes may be measured, extracted, stored and provided for use in source content editing template(s) 150. Further, such editing style attributes may be automatically transferred from source content to target content to apply the same feel, flow, effects, and/or impressions from the source content correctly onto different target content provided by a user.

In an example camera movement or motion is transferred from source content to target content. For example, frame-to-frame camera motion may be detected and measured in each of source content and target content. In an example, movement in the target content is stabilized by undoing camera motion or movement in target content based on inverting projection of the target content $H_{target}^{-1}(t)$, for example, frame by frame. Once or as camera motion or movement is removed from target content, camera motion or movement from corresponding source content may be applied to the target content. For example, transferring camera movement or motion from source content to target content may include undoing original motion, movement, or projection in target content and applying camera motion or movement from source content: $H_{target}^{-1}(t)*H_{ref}(t)$. In an example, reprojection of camera motion or movement may be performed based on concatenating homographies together from source content to obtain a projection that is applied to target content once, for example, instead of performing reprojection from source content to target content numerous times (e.g., for each frame in a video).

In an example, a starting position $H_{ref}(t=start)$ is determined in a segment of target content based on camera motion or movement that is being transferred from source content. For example, a starting position for reprojection onto target content may include an initial scale and offset. In an example, the starting position is determined based on analyzing target content in view of camera motion or movement that is being transferred to a segment of target content. For example, starting position may be determined so that camera movement or motion projected onto target content remains within boundaries of the target content (e.g., stays within and does not go beyond a frame). As such, starting position may be determined based on moving the starting position to a particular location within a frame of target content and/or at a particular zoom level to allow camera movement or motion from source content to be performed correctly based on the target content. In some examples, target position is determined and/or adjusted, for example, to enlarge or maximize camera motion or movement that is being applied to target content.

Figure 7:
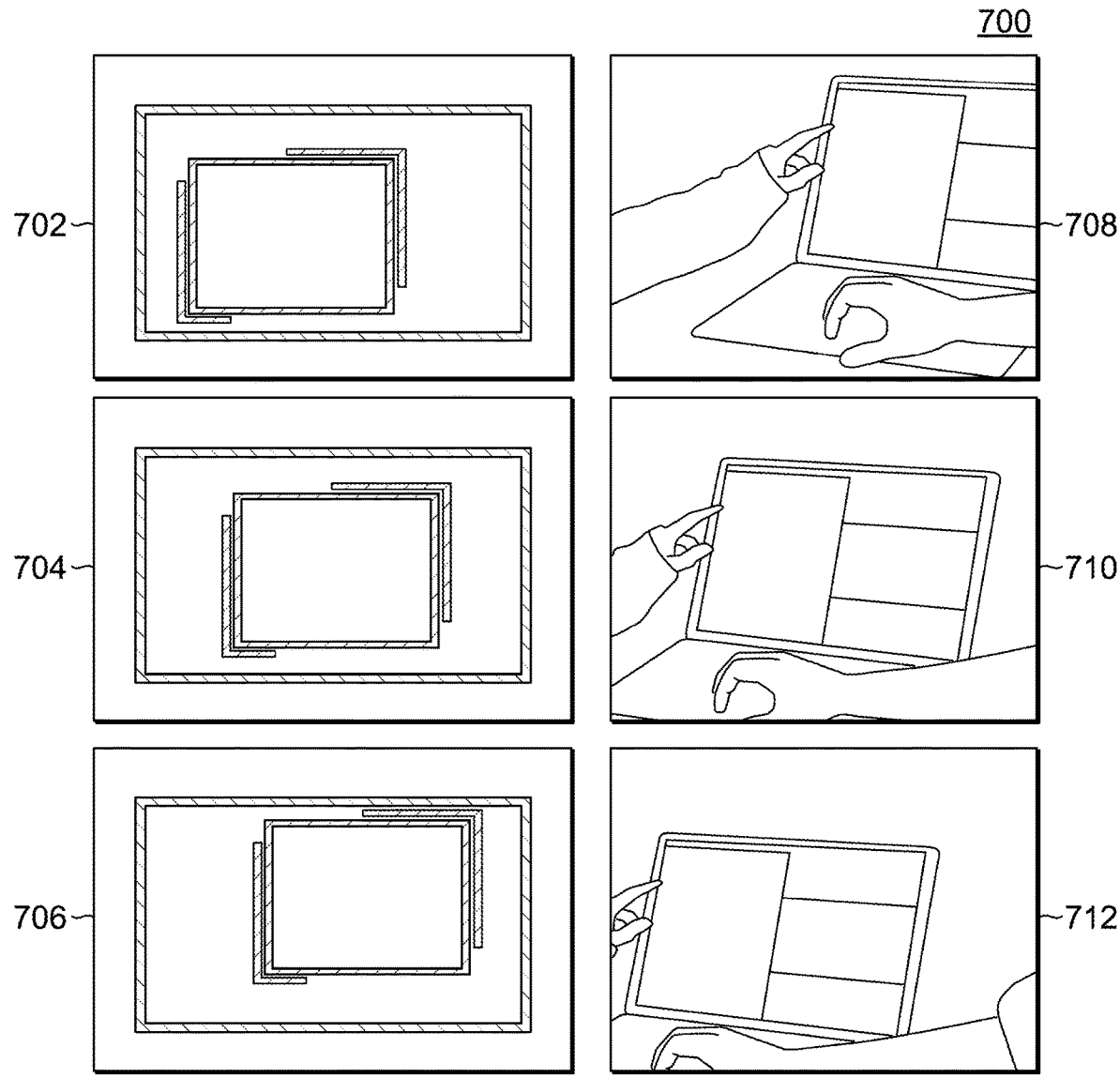
FIG. 7 depicts an illustration depicting example reprojection of a starting position for target content based on camera motion in source content according to example embodiments of the present disclosure.

FIG. 7 depicts an illustration 700 for reprojection of a starting position for target content based on camera motion of source content for automated non-linear editing style transfer. In an example, images 702-706 represent positioning of source content movement within a rectangular frame boundary of target content so that movement being applied from the source content remains within bounds while maximizing the size and coverage of shot contents as shown in images 708-712.

For example, image 702 shows a determined starting position for source content movement within a rectangular boundary of target content. Image 708 shows the starting position as viewed in a frame of the target content. Image 704 shows the beginning of movement applied from the source content within the rectangular frame boundary of target content. Image 710 shows how the source content movement corresponds and appears within a frame of the target content. Image 706 shows how the applied source content movement continues and remains within the rectangular frame boundary of the target content. Image 712 shows the corresponding movement from image 706 within a frame of the target content.

In an example, any one or more editing style attributes of source content may be transferred to target content. For example, playback speed detected and measured in source content may be transferred and applied to target content at the same rate or at a different rate (e.g., faster, slower) than in the source content. In some examples, playback of source content and target content is computed as a constant value. In addition, frame resampling may be used to transfer the playback speed from source content to target content before reprojection $H_{target}^{-1}(S*t)*H_{ref}(S*t)$.

In an example, lighting and brightness of source content is transferred to target content. In some examples, a brightness detector is used to detect and measure lighting or brightness, for example, over time in source content. For example, a brightness detector may average the value of lighting and/or pixels in a shot of source content. Such values then may be used to adjust lighting and brightness in target content, for example, to transfer stylistic lighting adjustments such as fades and transitions from source content to target content.

In various examples, editing style attributes may be transferred from source content and target content of the same type and/or source content and target content of different types. For example, a shot from target video content may be matched to and receive various editing style attributes from a shot of source video content via automated editing style transfer. Similarly, one or more target content images may be matched to and receive various editing style attributes from different forms of source content (e.g., one or more source content shots and/or images). In one example, a target content image is matched to a shot of source video content. A video segment then may be generated from the target content image, for example, by repeating the image as a frame over a period of time. Editing style attributes such as measured movement in source video content (e.g., a shot) then may be transferred to the generated video segment for the matching target content image.

Figure 3:
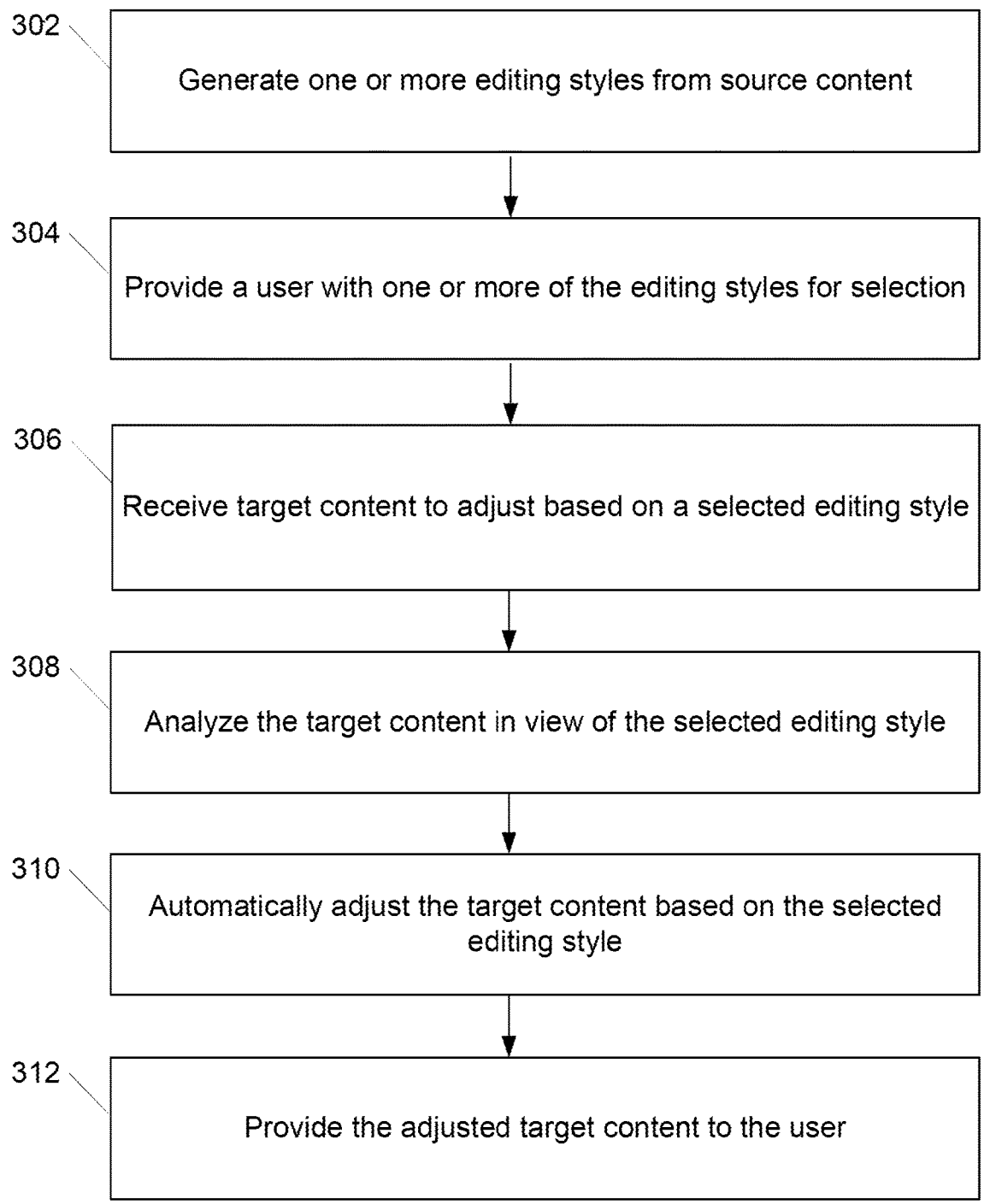
FIG. 3 depicts a flow diagram of an example method for performing automated non-linear editing style transfer from source content to user-provided target content according to example embodiments of the present disclosure.

FIG. 3 depicts a flow diagram of an example method for performing automated non-linear editing style transfer from source content to user-provided target content according to example embodiments of the present disclosure.

Although FIG. 3 depicts steps performed in a particular order for purposes of illustration and discussion as an example, the methods of the present disclosure are not limited to the particularly illustrated order or arrangement.

The various steps of the method 300 can be omitted, rearranged, combined, and/or adapted in various ways without deviating from the scope of the present disclosure.

At 302, a computing system generates one or more editing styles from source content. In an example, automated non-linear editing system 140 receives one or more segments or pieces of content. For example, any user such as an end user, creator, administrator, or other person may provide one or more pieces of source content. In some examples, source content may automatically be selected or determined based on ratings, user feedback, machine learning analysis, content type, genre, user attributes, user preferences, and/or other ways to identify source content for use with automated non-linear editing system 140.

In an example, automated non-linear editing system 140 generates one or more editing styles for each of one or more pieces of source content. In various examples, automated non-linear editing system 140 analyzes and processes source content according to examples of the present disclosure to detect, measure, and record editing style attributes of source content. Editing style attributes may include, for example, camera motion, focus, zoom, transition, playback speed, color, lighting, audio, or text associated with the respective shots of a source video. In some examples, various aspects of an editing style may be determined and applied to target content, for example, during a user session. In other examples, source content editing template(s) 150 may be created and stored with information about an editing style. Such information then may be used and reused across any number of users to automatically apply an editing style from source content to various target content.

At 304, the computing system provides a user with one or more of the editing styles for selection. In an example, automated non-linear editing system 140 provides a user with an option to select one or more source content items with an editing style. For example, a user may select one or more available editing styles to apply to target content of the user. For example, a user may select a single source content editing style to apply to target content. A user also may generate different versions of the target content that each correspond to a different source content editing style (e.g., for comparison, to determine a favorite, etc.).

In various examples, a user is provided with an opportunity to preview source content associated with respective editing styles, for example, using thumbnail previews or other methods of providing access to associated source content. In an example, source content and editing styles may be searchable. Source content and associated editing styles also may be grouped together for presentation to a user, for example, based on subject matter, channels, influencers, creators, and/or categories such as vacations, sports, hiking, biking, cooking, etc. For example, a user may search for source content relating to vacations and be presented with several source content editing styles for selection. In some examples, a user also may provide or select their own source content including, but not limited to, video segments, music videos, original videos, pictures, photos, etc. Such content may be provided, for example, from one or more sites or services such as photo sharing, video sharing, social networking, etc.

At 306, the computing system receives target content to adjust based on a selected editing style. In an example, a user provides one or more pieces of target content that are to be analyzed and matched to source content to perform automated editing style transfer. For example, a user may provide one or more pieces of visual content, such as images and/or videos. Such content may be user-generated content associated with a user account. In some examples, a user may specify one or more particular pieces of target content to use. A user also may provide a location comprising a collection of content that the user wishes to use as target content. In one example, a user provides a user account of the user associated with photo sharing services, video sharing services, storage services, social media, and/or one or more other services, which automated non-linear editing system 140 may access and analyze to identify various content of the user to use as target content.

At 308, the computing system analyzes the target content in view of the selected editing style. In an example, automated non-linear editing system 140 of a computing system analyzes each of one or more pieces of target content provided by or associated with a user. For example, data, metadata, imagery and other aspects of target content may be analyzed to identify and classify subject matter and objects associated within respective pieces of the target content.

In some examples, shot boundary detection, as described at 202 and in the present disclosure for example, may be performed on target video content to identify shots and shot boundaries in video content. Similarly, object detection and classification, as described at 204 and in the present disclosure for example, may be performed on target visual content to identify one or more of objects, expression, activity, shot focus, and/or other aspects of visual content. Such detection and classification of target visual content may be performed, for example, to aid in the matching of source content to target content when performing automated editing style transfer.

In an example, automated non-linear editing system 140 matches analyzed target content to respective segments of source content. In one example, source video content may comprise six shots that have been identified and analyzed for automated editing style transfer based on examples of the present disclosure. For each of the six shots in the source video content, automated non-linear editing system 140 compares various aspects of the shots including, but not limited to, one or more of shot length, shot focus, objects, expression, activity, etc. to various target content that has been analyzed. For example, automated non-linear editing system 140 may compare and rate one or more pieces or segments of target content that match source content. Matching target content then may be selected, for example, based on one or more criteria, which may be a highest rated matching piece or segment of target content for each of the six shots in the source video content.

At 310, the computing system automatically adjusts the target content based on the selected editing style. In an example, automated non-linear editing system 140 of a computing system modifies each of one or more pieces or segments of target content to transfer editing style from source content to the target content. In some examples, automated non-linear editing system 140 may modify target content prior to transferring editing style. For example, length of a shot of target video content may be adjusted, target content orientation may be adjusted, and/or target content quality may be modified automatically prior to performing automated editing style transfer.

At 312, the computing system provides the adjusted target content to the user. In an example, automated non-linear editing system 140 of a computing system automatically transfers editing style from each of one or more segments or pieces of source content to one or more matching segments or pieces of target content. In various examples, automated non-linear editing system 140 may generate a new piece of content, such as a new video comprising target content having an editing style that was transferred from source content.

In an example, a user may be provided with one or more user interface(s) 106 to perform various operations involving generated output comprising target content with an editing style applied from source content. For example, a user may use user interface(s) 106 to store, modify, publish, regenerate, and/or discard the associated output. In one example, user interface(s) 106 may include a simplified editing interface that allows a user to include, exclude, and/or rearrange each of one or more shots in generated visual output from automated non-linear editing system 140. For example, if a user dislikes one shot or image in generated output comprising twenty shots or images, the user could select the particular shot or image to be excluded and save the resulting output.

Example Devices and Systems

Figure 8:
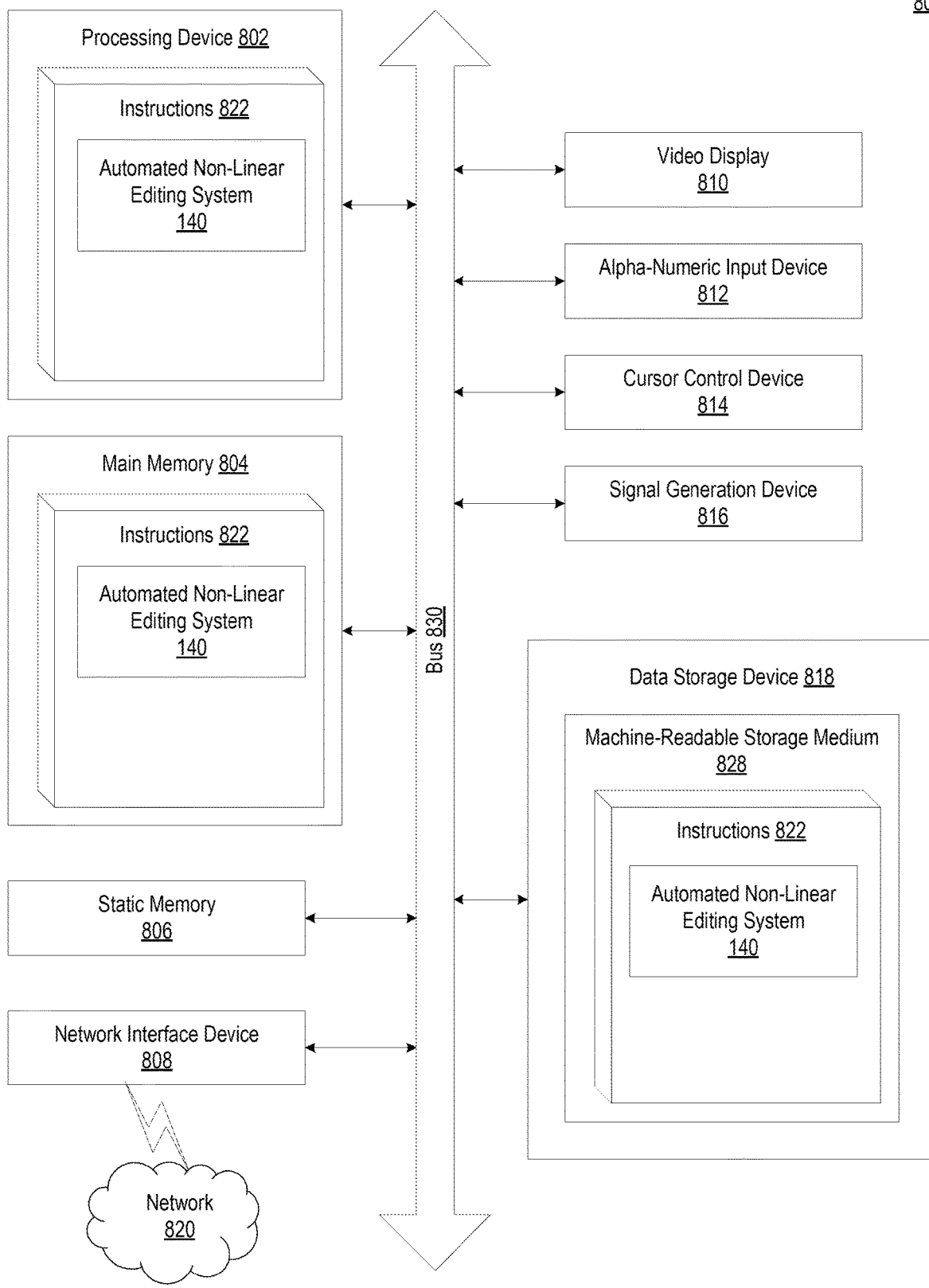
FIG. 8 depicts a block diagram of an example computer system that may perform one or more of the example embodiments of the present disclosure.

FIG. 8 illustrates a diagram of an example machine in the form of a computer system 800, within which a set of instructions for causing the machine to perform any one or more of the operations discussed herein may be executed. In other examples, the machine may be connected (e.g., networked) to other machines in a LAN, an intranet, an extranet, or the internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a wearable computing device, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the operations discussed herein.

Computer system 800 includes at least one processing device (processor 802), a main memory 804 (e.g., read-only memory (ROM), flash memory, dynamic random access memory (DRAM) such as synchronous DRAM (SDRAM), double data rate (DDR SDRAM), or DRAM (RDRAM), etc.), a static memory 806 (e.g., flash memory, static random access memory (SRAM), etc.), and a data storage device 818, which communicate with each other via a bus 830.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 also may be one or more special-purpose processing devices such as an application specific integrated circuit (ASIC), a field programmable gate array (FPGA), a digital signal processor (DSP), network processor, or the like. The processor 802 is configured to execute instructions 822 for performing the operations discussed herein.

The computer system 800 also may include a network interface device 808. The computer system 800 may further include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a computer-readable storage medium 828 on which is stored one or more sets of instructions 822 (e.g., software computer instructions) embodying any one or more of the examples described herein. The instructions 822 also may reside, completely or at least partially, within the main memory 804 and/or within the processor 802 during execution thereof by the computer system 800, the main memory 804 and the processor 802 also constituting computer-readable storage media. The instructions 822 may be transmitted or received over a network 820 via the network interface device 808.

In one example, the instructions 822 include instructions for one or more modules of an automated non-linear editing system 140 (e.g., automated non-linear editing system 140 of FIG. 1) and/or a software library containing methods that call an automated non-linear editing system 140. While the computer-readable storage medium 828 (machine-readable storage medium) is shown as an example to be a single medium, the term "computer-readable storage medium" should be taken to include a single medium or multiple media (e.g., a centralized or distributed database, and/or associated caches and servers) that store the one or more sets of instructions. The term "computer-readable storage medium" also may include any medium that is capable of storing, encoding or carrying a set of instructions for execution by the machine and that cause the machine to perform any one or more of the operations of the present disclosure. The term "computer-readable storage medium" shall accordingly be taken to include, but not be limited to, solid-state memories, optical media, and magnetic media.

Numerous details are set forth in the foregoing description. However, it will be apparent to one of ordinary skill in the art having the benefit of this disclosure that the present disclosure may be practiced without these specific details. In some instances, well-known structures and devices are shown in block diagram form, rather than in detail, to avoid obscuring the present disclosure.

Some portions of the detailed description have been presented in terms of processes and symbolic representations of operations on data bits within a computer memory. Here, a process is generally conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "analyzing," "determining," "identifying," "adjusting," "transmitting," "receiving," "processing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other examples will be apparent to those of skill in the art upon reading and understanding the above description. The scope of the disclosure therefore should be determined with reference to the appended claims, along with the full scope of equivalents to which such claims are entitled.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for performing non-linear editing style transfer from source video content to target content, the computer-implemented method comprising:
    determining one or more shot boundaries individually identifying a continuous view in a source video based on analyzing the source video;
    identifying individual ones of shots of the source video that comprise corresponding series of frames captured or filmed by corresponding cameras based at least in part on determining the one or more shot boundaries;
    analyzing identified content in each of the shots of the source video;
    determining an editing style for each of the shots in the source video based at least in part on measuring camera motion across the frames within the respective shots;
    determining a content segment to adjust from a set of target content based at least in part on analyzing the set of target content in view of the identified content and the determined editing style of a shot from the source video; and
    automatically adjusting the content segment from the set of target content based at least in part on modifying the content segment with the determined editing style of the shot from the source video,
    wherein the automatic adjusting comprises stabilizing camera motion of the respective content segment determined based at least in part on the respective editing style of the respective shot from the source video by, prior to the modifying of the respective content segment, maintaining, within boundaries of the set of target content, the camera motion projected onto the set of target content.

2. The computer-implemented method of claim 1, wherein the determining of the one or more shot boundaries is based at least in part on detecting a change in frame colors across the frames of the source video.

3. The computer-implemented method of claim 1, wherein the determining of the one or more shot boundaries is based at least in part on analyzing keypoint matching across the frames of the source video.

4. The computer-implemented method of claim 1, further comprising:
    generating an editing template for the source video, the editing template being reusable for automatically transferring editing style of respective shots in the source video to other visual content; and
    storing the editing template generated for the source video.

5. The computer-implemented method of claim 4, wherein the editing template comprises one or more of information about the one or more shot boundaries in the source video, one or more of the shots in the source video, the identified content in the respective shots in the source video, and at least one editing style determined for the respective shots in the source video.

6. The computer-implemented method of claim 5, wherein the content segment from the set of target content is at least one of determined or automatically adjusted, based at least in part on the information from the editing template generated for the source video.

7. The computer-implemented method of claim 1, further comprising:
    generating output content comprising the adjusted content segment of the set of target content that was adjusted based on the editing style from the shot of the source video.

8. The computer-implemented method of claim 1, further comprising:
    determining a second content segment to adjust from the set of target content based on analyzing the set of target content in view of the identified content and the determined editing style of a second shot from the source video; and
    automatically adjusting the second content segment based at least in part on modifying the second content segment with the editing style from the second shot of the source video.

9. The computer-implemented method of claim 8, wherein output content comprises the adjusted second content segment of the set of target content that was adjusted based on the editing style from the second shot of the source video.

10. The computer-implemented method of claim 1, wherein the modifying of the respective content segment from the set of target content comprises applying camera motion from the respective shot of the source video.

11. The computer-implemented method of claim 1, wherein the modifying of the respective content segment from the set of target content comprises applying zoom from the respective shot of the source video.

12. The computer-implemented method of claim 1, wherein the editing style comprises one or more of information about framing, camera motion, focus, zoom, transition, playback speed, color, lighting, audio, or text associated with the respective shot.

13. The computer-implemented method of claim 1, wherein the content segment is a set of one or more images.

14. The computer-implemented method of claim 1, wherein the set of target content comprises a second video.

15. The computer-implemented method of claim 1, wherein the camera motion of the source video is pan-tilt-zoom camera motion.

16. The computer-implemented method of claim 1, wherein any of the shots of the source video comprises a corresponding series of frames that are i) captured or filmed by a corresponding camera that is different than for another shot that is separated by a corresponding boundary of the one or more shot boundaries, and ii) used to identify the corresponding boundary based on the corresponding camera being different from another camera that captured or filmed the other shot.

17. A computer-implemented method for performing non-linear editing style transfer from source video content to target content, the computer-implemented method comprising:
 determining one or more shot boundaries individually identifying a continuous view in a source video based on analyzing the source video;
 identifying individual ones of shots of the source video that comprise corresponding series of frames captured or filmed by corresponding cameras based at least in part on determining the one or more shot boundaries;
 analyzing identified content in each of the shots of the source video video based on performing object detection on the respective shots;
 determining an editing style for each of the shots in the source video based at least in part on measuring camera motion across a series of frames within the respective shots;
 determining a content segment to adjust from a set of target content based at least in part on analyzing the set of target content in view of the identified content and the determined editing style of a shot from the source video; and
 automatically adjusting the content segment from the set of target content based at least in part on modifying the content segment with the determined editing style of the shot from the source video,
 wherein the automatic adjusting comprises stabilizing the camera motion of the respective content segment determined based at least in part on the respective editing style of the respective shot from the source video by, prior to the modifying of the respective content segment, maintaining, within boundaries of the set of target content, the camera motion projected onto the set of target content.

18. The computer-implemented method of claim 17, wherein the stabilizing the camera motion comprises stabilizing the camera motion and camera movement by, prior to the modifying of the respective content segment, maintaining, within boundaries of the set of target content, the camera motion and the camera movement projected onto the set of target content.

19. The computer-implemented method of claim 17, wherein the stabilizing the camera motion comprises stabilizing the camera motion by, prior to the modifying of the respective content segment, maintaining, within boundaries of the set of target content, the camera motion projected onto the set of target content, and
 wherein the camera motion is detected across each of the series of the frames based on measuring a distance between respective keypoints across the series.

20. A computer system comprising:
 one or more processors; and
 one or more non-transitory computer-readable media that collectively store computer executable instructions that when executed by one or more computer processors will cause the computer system to perform operations comprising:
 determining one or more shot boundaries individually identifying a continuous view in a source video based on analyzing the source video;
 identifying individual ones of shots of the source video that comprise corresponding series of frames captured or filmed by corresponding cameras based at least in part on determining the one or more shot boundaries;
 analyzing identified content in each of the shots of the source video;
 determining an editing style for each of the shots in the source video based at least in part on measuring camera motion across the frames within the respective shots;
 determining a content segment to adjust from a set of target content based at least in part on analyzing the set of target content in view of the identified content and the determined editing style of a shot from the source video; and
 automatically adjusting the content segment from the set of target content based at least in part on modifying the content segment with the determined editing style of the shot from the source video,
 wherein the automatic adjusting comprises stabilizing camera motion of the respective content segment determined based at least in part on the respective editing style of the respective shot from the source video by, prior to the modifying of the respective content segment, maintaining, within boundaries of the set of target content, the camera motion projected onto the set of target content.

* * * * *